United States Patent [19]

Guettouche et al.

[11] Patent Number: 4,572,523
[45] Date of Patent: Feb. 25, 1986

[54] SEALING JOINT AND RETAINING RING FOR PIPE GROOVED BELL AND STRAIGHT SPIGOT JOINT

[75] Inventors: Ali Guettouche, Geeste, Fed. Rep. of Germany; Bernhard Lodder, Hardenberg, Netherlands

[73] Assignee: Wavin B.V., Zwolle, Netherlands

[21] Appl. No.: 513,999

[22] Filed: Jul. 15, 1983

[30] Foreign Application Priority Data

Jul. 17, 1982 [DE] Fed. Rep. of Germany ....... 3226875

[51] Int. Cl.$^4$ ..................... F16J 15/06; F16L 55/00
[52] U.S. Cl. ............................. 277/207 A; 277/209; 277/DIG. 2; 285/231; 285/345; 285/379
[58] Field of Search ........... 277/207 R, 207 A, 207 B, 277/DIG. 2, 208–211, 27; 285/231, 232, 345, 379

[56] References Cited

U.S. PATENT DOCUMENTS

| | | | |
|---|---|---|---|
| 3,315,970 | 4/1967 | Holloway | 277/207 A |
| 3,372,942 | 3/1968 | Carter | 277/207 A |
| 4,034,994 | 7/1977 | Ohta et al. | 277/207 A |
| 4,120,521 | 10/1978 | Parmann | 285/345 X |
| 4,155,557 | 5/1979 | Grebert | 277/27 |
| 4,362,323 | 12/1982 | Lodder et al. | 285/379 X |

FOREIGN PATENT DOCUMENTS

| | | | |
|---|---|---|---|
| 2435089 | 2/1975 | Fed. Rep. of Germany | 277/207 A |
| 7803870 | 10/1979 | Sweden | 277/DIG. 2 |
| 1033756 | 6/1966 | United Kingdom | 277/207 A |
| 1133412 | 11/1968 | United Kingdom | 277/207 A |
| 1158358 | 7/1969 | United Kingdom | 285/379 |
| 1168040 | 10/1969 | United Kingdom | 285/231 |

Primary Examiner—Robert S. Ward
Attorney, Agent, or Firm—Wilkinson, Mawhinney & Theibault

[57] ABSTRACT

A pipe member having at one end a socket for the insertion of a further pipe member and a corrugation in the wall of the socket containing a packing ring of resiliently deformable material, and a retaining ring received in an internal recess in the packing ring has its packing ring formed with an outer peripheral portion to fit the contour of the corrugation and annular front and rear projections situated respectively axially in front of and to the rear of the retaining ring to co-operate with the inserted pipe member to form pressure shoulders between which the retaining ring is disposed in the central region of the packing ring, the pressure shoulders transmitting compressive forces to the outer peripheral portion of the packing ring, the outer peripheral portion of the packing ring extending over the two pressure shoulders and over the retaining ring to bear against the corrugation under compressive load.

19 Claims, 7 Drawing Figures

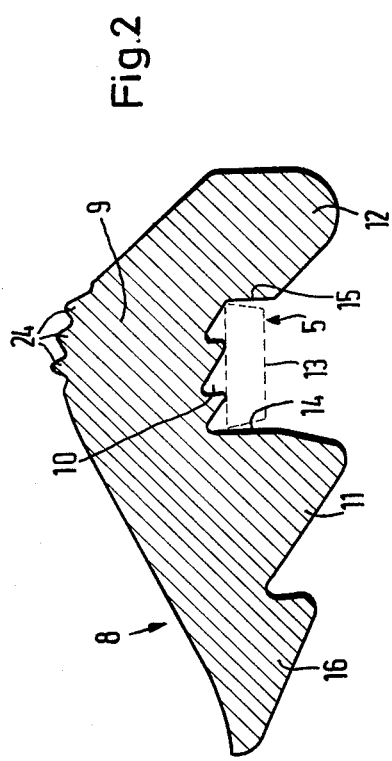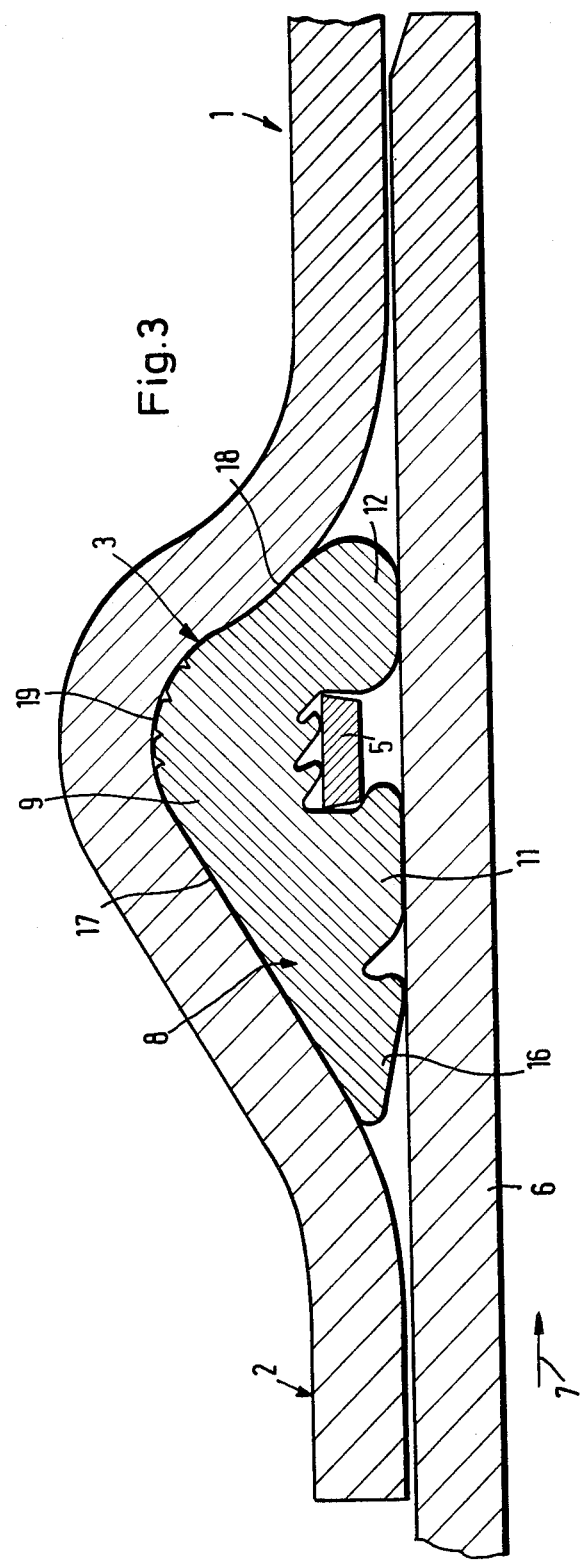

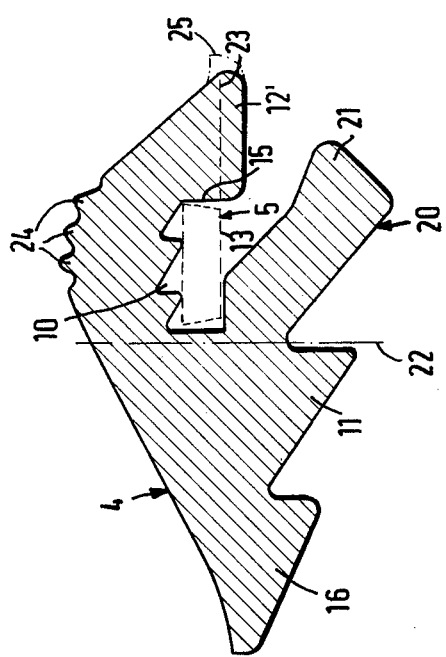
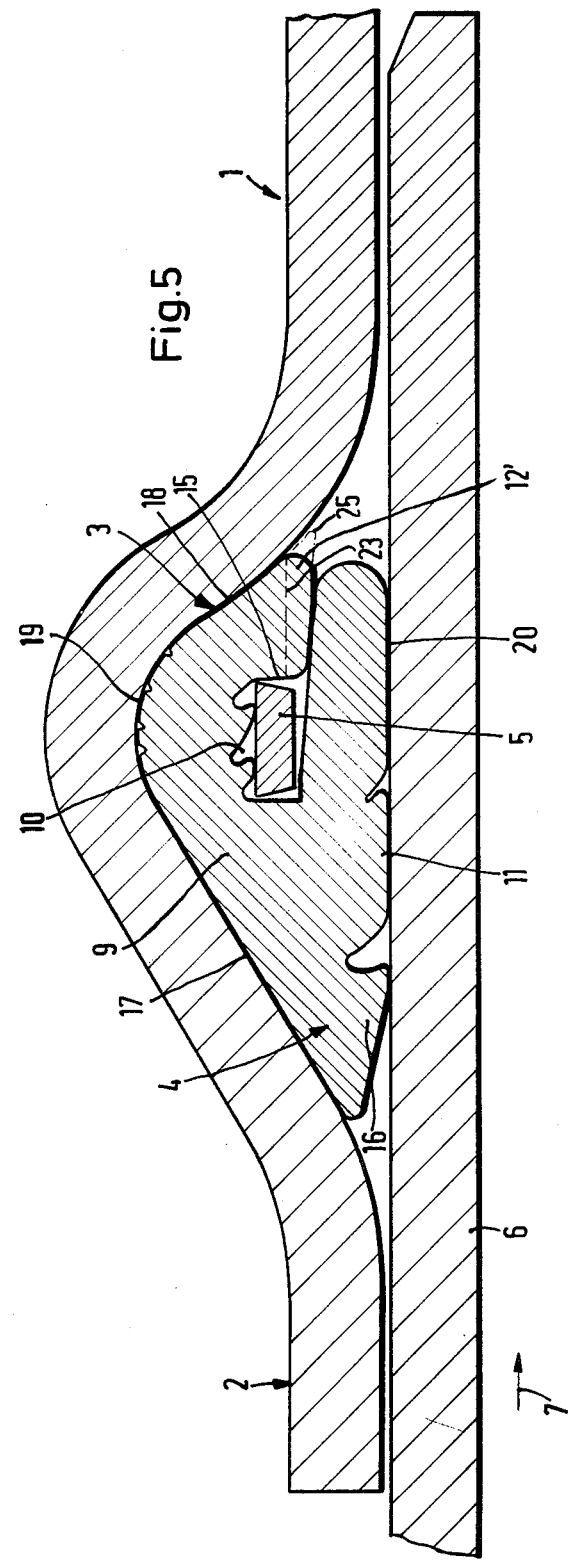

SEALING JOINT AND RETAINING RING FOR PIPE GROOVED BELL AND STRAIGHT SPIGOT JOINT

The invention relates to pipe members and concerns a pipe member having a socket formed by an end portion thereof and a radially outwardly directed annular groove or corrugation in the wall of the pipe member end portion, a packing ring of resiliently deformable material disposed inside the pipe member end portion in the corrugation and a retaining ring received in an internal recess in the packing ring, the packing ring having an outer peripheral portion to fit with the pipe member wall defining the groove, the arrangement being such that an insertion of another or second pipe member into the socket, the packing ring is compressed against the wall of the pipe member defining the groove to seal the gap between the inserted pipe member and the socket.

Known pipe members of this kind consist, in particular, of plastic material such as polyvinyl chloride. The retaining ring consists of a stiffer material than that of the packing ring and has the purpose of holding the packing ring, which is preassembled at the works, captive in the groove in the wall of the pipe member end portion forming the socket, and of facilitating insertion of a further pipe member into the socket during the establishment of a pipe connection.

In order to ensure that the packing ring is then compressed in the groove in the wall of the pipe member end portion to seal the gap between the inserted pipe member and the socket the packing ring is provided with a projection disposed axially behind the retaining ring to the side thereof remote from the open end of the socket. The projection, on insertion of a further pipe member into the socket, forms with the inserted pipe member, a pressure shoulder which acts to compress the packing ring.

The compression pressure is exerted upon the packing ring behind the retaining ring with this arrangement, with the consequence that the outer peripheral portion of the packing ring, which is shaped to fit the contour of the pipe member wall defining the groove, is pressed unequally into the contour of the groove.

It has been found that this gives rise to certain problems with the sealing action.

It is an object of the present invention to reduce or overcome this problem.

According to the present invention, there is provided a pipe member having a socket formed by an end portion thereof and a radially outwardly directed annular groove in the wall of the pipe member end portion, a packing ring of resiliently deformable material disposed inside the pipe member end portion in the groove and a retaining ring received in an internal recess in the packing ring. The packing ring has an outer peripheral portion which fits with the pipe member wall defining the groove and front having rear projections situated respectively axially in front of and behind the retaining ring to the side thereof adjacent the open end of the socket and to the side thereof remote from the open end of the socket respectively. The projections, upon insertion of a further pipe member into the socket, form in co-operation with the inserted pipe member pressure shoulders which act to compress the packing ring against the pipe member wall defining the groove over the whole outer peripheral portion of the packing ring. With this development, the pressure shoulders formed by the front and rear projections give rise to a particularly firm pressing in of the packing ring radially into the groove in the wall of the pipe member end portion, and in the final result, the whole outer peripheral portion of the packing ring, extends over the two pressure shoulders and over the retaining ring, is compressively applied against the pipe member wall defining the groove, closely following its contour. Thus, a particularly good seal between the pipe members is achieved. Conveniently, the groove is formed as a corrugation in the wall of the pipe member end portion and conveniently also, the groove is of arch shaped contour in axial cross-section of the pipe member.

Such corrugations, which have a contour of gentle, arcuate or smooth lines do not, in themselves, offer the outer peripheral portion of the packing ring any pronounced anchoring or counter-surface for sealing engagement and the present invention is particularly applicable to pipe members in which the annular groove in the wall of the pipe member end portion is of smooth form.

During the insertion of a further pipe member into the socket of a pipe member according to the present invention, for making a pipe connection, the front projection of the packing ring situated axially in front of the retaining ring, is first pressed into the groove or corrugation thus causing deformation and compression of which, the packing ring executes a small axial forward movement. Immediately following this, the rear projection of the packing ring is pressed into the groove or corrugation by the inserted pipe member, with further deformation and compression of the packing ring creating, as with a front projection which, the rear projection transmits a compressive force to the outer peripheral portion of the packing ring. This is accompanied by a small axial rearward movement of the packing ring. The opposite axial movements of the packing ring and the force components produced in this manner, compresses the packing ring, improve the sealing action.

According to an optional feature of the present invention, the internal recess in the packing ring opens inwardly towards the interior of the pipe member in which case, in their uncompressed state, said front and rear projections have a cross-sectional shape which tapers radially inwardly of the pipe member beyond the inner circumference of the retaining ring. With this construction, the retaining ring is visibly held in the internal recess in the packing ring with the ring in its assembled state in the socket of the pipe member and when a further pipe member is inserted into the socket the retaining ring lies spaced from the wall of the inserted pipe member by an amount corresponding to the radial thickness of portions of the front and rear projections or of the front projection held compressed between the wall of the inserted pipe member and the inner circumferential face of the retaining ring, at its front and rear edges or its front edge respectively.

In an alternative construction according to the present invention, said front projection has a rearwardly extending inner sealing lip to engage over said internal recess in compressive contact with said rear projection to transmit compressive forces to said rear projection on insertion of a further pipe member into the socket.

With this arrangement the retaining ring is held practically invisibly in the internal recess in the packing ring with the ring in its assembled state in the socket of the pipe member and when a further pipe member is inserted into the socket, particularly in the installed state in a pipe connection, the inner sealing lip engages over the whole area of the inner face of the retaining ring.

Specific embodiments of the present invention will now be described by way of example and not by way of limitation with reference to the accompanying drawings in which:

FIG. 2 is an axial section through a packing ring in the uncompressed state thereof;

FIG. 3 shows the packing ring of FIG. 2 held compressed in a pipe connection as shown in FIG. 1;

Figure 6:
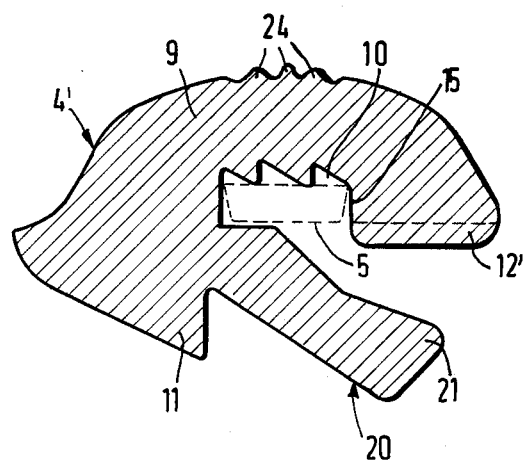
Figure 7:
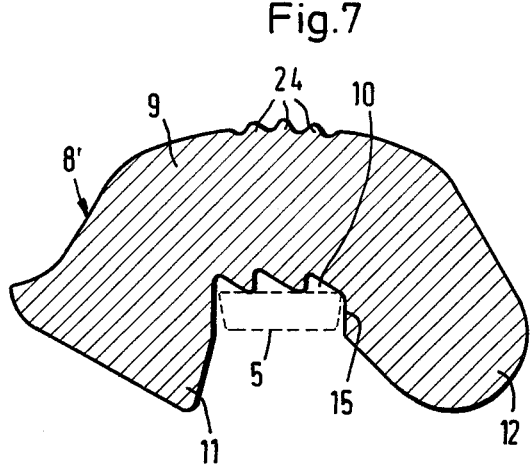

FIGS. 4 and 5 are illustrations corresponding to FIGS. 2 and 3 showing a further construction of packing ring; and FIGS. 6 and 7 are illustrations corresponding to FIG. 2 and each shows a still further construction of packing ring.

Figure 1:
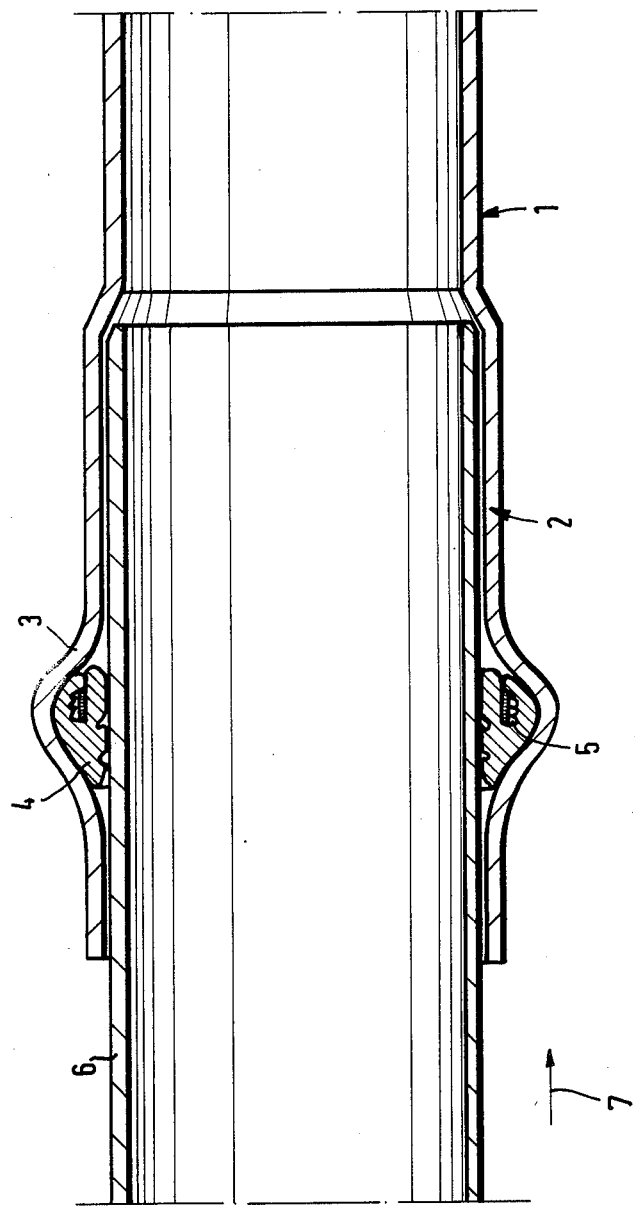
FIG. 1 is an axial section through a pipe connection comprising a pipe member having an end socket receiving a further pipe member with the inclusion of a packing ring held compressed between the further pipe member and the socket.

With reference now to the accompanying drawings, the pipe connection shown in FIG. 1 comprises a pipe member 1 having a socket 2, the wall of which is provided with a radially outwardly directed groove or corrugation 3 extending around it in the form of a ring. Disposed in the corrugation 3 is a packing ring 4 of resiliently deformable material, particularly rubber or an elastomeric material which is held in the corrugation 3 by a retaining ring 5 made of a stiffer material than that of the packing ring 4, and which may be a semi-rigid or of a rigid plastics material. The pipe connection also comprises a further pipe member 6 which is assembled by insertion into the socket 2, in the direction of the arrow 7, and which is a push fit in the socket. The insertion of the pipe member 6 compresses the packing ring 4 in two stages and in such a manner that the outer peripheral portion of the packing ring 4 is pressed into the groove or corrugation 3 to seal the gap between the wall of the pipe member 6 and the wall of the socket 2 and thus the pipe connection.

Various forms of packing or sealing ring 4 are illustrated with reference to FIGS. 2 to 7 in illustrations corresponding to the upper half of FIG. 1 to a larger size, any of which may be used in a pipe connection as shown in FIG. 1 and incorporating a pipe member 1 in accordance with the present invention.

FIGS. 2 and 3 show a packing or sealing ring 8 with an outer peripheral portion 9 contoured to fit within the contour of the groove or corrugation 3. The packing ring 8 receives the retaining ring 5 in an internal recess 10 in the packing ring, the roof of which is of toothed construction to take up manufacturing tolerances. Seen in the direction of arrow 7, the packing ring 8 has a front projection 11 disposed axially in front of the retaining ring 5 and a rear projection 12 situated axially behind the retaining ring 5. The internal recess 10 in the packing ring 8 opens towards the interior of the pipe 1 so that the retaining ring 5, shown in broken lines in FIG. 2, is visible from the inside of the socket 2 with the packing ring 8 in its assembled state in the socket. In the uncompressed state of the packing ring 8, which can be seen in FIG. 2, the two projections 11 and 12 of the packing ring 8 have a cross-sectional shape which is directed substantially radially inwards towards the interior of the pipe and which tapers so as to become narrower in the region projecting beyond the inner peripheral surface 13 of the retaining ring 5. This ensures that the retaining ring 5 does not impair the transmission of compressive forces applied by the projections 11 and 12 to the outer peripheral portion 9 of the packing ring outwardly of the retaining ring.

The axially front end face 14 and the axially rear end face 15 of the internal recess 10 in the packing ring 8 are formed by opposite end faces of the front and rear projections 11, 12 respectively. In the uncompressed state of the packing ring 8, as FIG. 2 shows, the free inner edge of the rear projection 12 is disposed substantially in the same circumferential plane as the free inner edge of the front projection 11. The packing ring is further provided with a short guide extension 16 which is disposed in front of the front projection 11 in the direction of arrow 7 and which initially is engaged upon the insertion of pipe member 6 to locate the packing ring 8 in the groove or corrugation 3.

During the insertion of the pipe member 6 into the socket 2 in the direction of the arrow 7 the projections 11 and 12 are compressed by the pipe member 6 and form pressure shoulders which act to compress the packing ring 8 into the annular groove or corrugation 3. During the insertion of the pipe member 6 the pipe member 6 first engages the projection 11 and at first presses the packing ring 8 primarily against the wall 17 of the groove or corrugation 3. The pipe member 6 then engages the projection 12 and the latter presses the packing ring 8 primarily against the wall 18 of the groove or corrugation, the packing ring executing an axial reciprocating movement as oppositely directed components of compressive force are produced in the material of the packing or sealing ring 8, outwardly of the retaining ring 5, by the transmission of pressing forces first through the projection 11 and then through the projection 12, which forces press the packing material of the outer peripheral portion 9 of the packing ring 8 particularly firmly into the roof 19 of the groove or corrugation 3. In this manner, the whole outer peripheral portion 9 of the packing ring 8, extends over the two pressure shoulders or projections 11 and 12 and over the retaining ring 5, which bear with a compressive load against the corrugation.

In FIGS. 4 and 5, the same reference numerals are used to designate parts corresponding with parts of the sealing or packing ring 8 described with reference to FIGS. 2 and 3. In this example, the front projection 11 has an inner sealing lip 20 which extends rearwardly from the front projection 11 towards the rear projection 12' to engage over the internal recess 10 and into compressive contact with the rear projection 12' to transmit compressive forces to the rear projection 12' on insertion of the pipe member 6 into the socket 2. The rear projection is shortened in its radially inwardly directed extent in comparison with the projection 12 described with reference to FIGS. 2 and 3. The sealing lip 20, by co-operation with the inserted pipe member 6, engages the projection 12' and acts as a pressure transmitting member to transmit compressive forces to the projection 12' and for this purpose the sealing lip 20 is provided towards its rear end with a bead-shaped thickened portion 21 directed towards the projection 12'. The thickness of the rear end portion 21 of the inner sealing lip 20, measured in the radial direction, plus that of the projecting length of the projection 12' in relation to the inner peripheral surface 13 of the retaining ring 5 is substantially equal to the radial extent of the front projection 11, in relation to the inner peripheral surface 13 of the retaining ring 5.

The axial length of the front projection 11 of the packing ring 4, measured in the direction of arrow 7, reaches at most as far as a radial plane containing the end of the retaining ring 5 adjacent the mouth of the socket 2. In FIG. 4, the radial plane in which the rear end of the projection 11 lies is illustrated in chain line and designated by the reference numeral 22. The inner sealing lip 20 is formed on the packing ring 4 so as to project substantially out of the radial plane 22.

During the establishment of the pipe connection shown in FIG. 5, by inserting the pipe member 6 into the socket 2 of the pipe member 1 in the direction of arrow 7, the inner sealing lip 20 comes into sealing engagement with the pipe member 6 and its rear end portion 21 is brought into compressive contact with the projection 12' to transmit compressive forces thereto. In the installed state of the packing or sealing ring 4 which can be seen in FIG. 5, the inner sealing lip 20 engages over the retaining ring 5.

The packing ring 4 is pressed into the groove or corrugation 3 to seal the pipe connection in similar fashion to that described with reference to FIGS. 2 and 3 because the portion 21 of the sealing lip 20 acts as a pressure compressive force transmitting member so that the pressure shoulder 12' is pressed against the wall 18 of the corrugation to produce a rearwardly directed component of compressive force in the outer peripheral portion 9 of the packing ring. At the same time, the projection 11 is also pressed against the wall 17 of the corrugation and produces a forwardly directed component of compressive force so that oppositely directed components of compressive force are applied by the projections 11 and 12' outwardly of the retaining ring 5 so as again to cause the desired tight pressing of the outer peripheral portion 9 of the packing ring 4 into the corrugation 3. During the introduction of the pipe member 6, the packing ring 4 is moved briefly forwards and then backwards as the pipe member 6 engages and compresses first the projection 11 and then the sealing lip 20 to force the sealing lip 20 into compressive engagement with the projection 12', and this movement fits the outer peripheral portion 9 of the packing ring snugly into the corrugation 3 and particularly into the roof 19 of the corrugation 3 to form an extremely effective seal.

The transmission of compressive forces by the front projection 11, unhindered by the retaining ring 5, is achieved because the radial plane 22, in which the projection 11 ends axially, still lies in front of the end face of the retaining ring 5 adjacent the mouth of the socket 2. In the same manner, the projection 12' lies behind the opposite end face of the retaining ring 5 remote from the mouth of the socket 2 so that the compressive forces applied via the pressure shoulder formed by the projection 12' are also transmitted to the outer peripheral portion 9 of the packing ring unhindered by the retaining ring 5.

For enhanced sealing of the packing ring 4 in the groove or corrugation 3, the rear pressure shoulder 12' may be provided with a marginal extension 25 which is initially bent slightly outwards, as illustrated in chain line in FIGS. 4 and 5 and which engages the wall 18 of the corrugation axially beyond the sealing lip 20 in the installed condition of the pipe member 6.

Apart from this, the projection 12' may be provided, in the region of its contact face with the rear end portion 21 of the inner sealing lip 20, with passages 23 which, in the compressed state of the packing ring 4, establish a fluid connection between the internal recess 10 and the interior of the pipe 1 which is under pressure in operation of the pipe line so that the pressure of fluid in the pipe line also acts in the recess 10 to press the portion 9 of the packing ring against the wall of the corrugation.

In the embodiments shown in FIGS. 1 to 5, the packing ring 4 or 8 is provided in conjunction with a corrugation or groove 3 which is asymmetrical in construction in the axial direction and wherein, as known per se, the front wall 17 of the corrugation is inclined at an acute angle and the rear wall 18 of the corrugation is inclined at a steeper angle in comparison. In this case, the retaining ring 5 is disposed inside the packing ring 4 or 8 with its median plane offset from the centre of the corrugation towards the wall 18 of the corrugation.

FIGS. 6 and 7 show further modifications of the packing ring 4 or 8 which are suitable for use in grooves or corrugations which are symmetrical in the axial direction. In this case, the retaining ring 5 is disposed in each case with its median plane in the plane of symmetry of the corrugation, the shape of which can be seen from the outside contour of the outer peripheral portion 9 of the packing ring 4' or 8' following the contour of the corrugation. Apart from this, the packing rings 4' and 8' shown in FIGS. 6 and 7 correspond in all essential parts to the packing rings 4 and 8 shown in FIGS. 1 to 5, except that in both cases the front guide extension 16 of the packing rings 4 and 8 is omitted in the packing rings 4' and 8'.

It is common to all the specific forms of the present invention described with reference to the accompanying drawings that the rear projection 12 or 12' of the packing ring 4 or 4' or 8 or 8' is thickened in its region adjacent to the retaining ring 5 and its axial end face, forming the rear end face 15 of the internal recess 10, extends substantially radially. As a result of this, the packing ring 4 or 4' or 8 or 8' together with the retaining ring 5 is secured against accidental pulling out of the corrugation 3, particularly if, as provided in the embodiments illustrated, the retaining ring 5 has a trapezoidal cross-sectional shape with two acute angled edges and has its longest side disposed in the roof of the internal recess 10. Because of this construction an outer acute angled edge of the retaining ring 5 is pressed into the material of the packing ring and the retaining ring is thus secured against being pulled out of the packing ring.

In all the embodiments illustrated, the axial length of the retaining ring 5 is about 20% to 40% of the axial length of the corrugation 3 which, on the one hand, ensures a secure location of the packing ring in the corrugation 3 in the preassembled state of the pipe member 1 in a pipe connection, but on the other hand, also ensures a transmission of compressive forces, as far as possible unimpaired by the retaining ring 5, to the outer peripheral portion 9 of the packing ring in the installed condition of the pipe member, a pipe connection.

Further, common to all of the illustrated embodiments is the feature that the outer peripheral portion 9 of the packing ring 4 or 4' or 8 or 8' is provided at its outside with resiliently deformable ribs 24 which, in the embodiments illustrated, are confined in an axial location which corresponds substantially to that part of the outer profile of the portion 9 of the packing ring which is situated in the roof 19 of the corrugation 3. These ribs 24 can dig into and deform about any particles of foreign matter which may be present in the roof 19 of the corrugation, under the compressive loads produced during the establishment of a pipe connection and so contribute to a snug fit of the outer portion 9 of the packing ring against the roof and walls of the corrugation 3.

In all the embodiments illustrated, the retaining ring 5 may be disposed in a region of the packing ring 4 or 4' or 8 or 8' which lies inside the central peripheral plane of the sealing or packing ring. This ensures that the outer portion 9 of the packing ring has an adequate sealing mass.

The pipe member 1 having the socket 2 conveniently consists of plastics material, for example of polyvinyl chloride, but it may also consist of other suitable materials, for example, metal, baked or fired clay, or concrete.

We claim:

1. A first pipe member having a socket formed by an end portion thereof and a radially outwardly directed annular groove in the wall of the pipe member end portion, a sealing ring of resiliently deformable material disposed inside the pipe member end portion in the groove and a retaining ring received within an internal recess in the packing ring, said packing ring having an outer peripheral portion formed to fit within the pipe member wall defining the groove and front and rear projections situated respectively axially in front of and behind the retaining ring to the side thereof adjacent the open end of the socket, said front projection having an inner sealing lip (20) extending rearwardly from said front projection (11) towards the rear projection (12') to engage over said internal recess (10) and retaining ring (5) into compressive contact with said rear projection (12') to transmit compressive forces to the rear projection (12') on insertion of the second pipe member (6) into the socket (2), said projections on said sealing ring upon insertion of said second pipe member into the socket forming in co-operation therewith, pressure shoulders positioned to act so as to compress the packing ring against the pipe member wall defining the groove over the whole outer peripheral portion of the sealing ring.

2. A pipe member as claimed in claim 1, in which, in their uncompressed state, said front and rear projections have a cross-sectional shape which tapers radially inwardly of the pipe member beyond the inner circumference of the retaining ring.

3. A pipe member as claimed in claim 2 in which said rear projection is thickened in its region adjacent to the retaining ring and its end face forming the rear end face of the internal recess extends substantially radially.

4. A pipe member as claimed in claim 1 in which said internal recess has axially spaced opposite end faces formed by opposed end faces of the front and rear projections respectively.

5. A pipe member as claimed in claim 1 in which in their uncompressed state, said front and rear projections have their free radially inner edges disposed substantially in the same circumferential plane.

6. A pipe member as claimed in claim 1 in which the axial length of the retaining ring is 20% to 40% of the axial length of said groove.

7. A pipe member as claimed in claim 1 in which said groove has an asymmetrical crosssectional shape in the axial direction with a front wall of the groove inclined at an acute angle to the longitudinal axis of the pipe member and a rear wall of the groove inclined at a steeper angle, the retaining ring being disposed with its median plane off-set towards said rear wall.

8. A pipe member as claimed in claim 1 in which the outer peripheral portion of the packing ring is provided with resiliently deformable ribs.

9. A pipe member as claimed in claim 8 in which said ribs are restricted to a central axial longitudinal region of the packing ring and engage in the roof of said groove.

10. A pipe member as claimed in claim 1 in which said front projection has a guide extension for an inserted pipe member extending forwardly towards the open end of said socket.

11. A pipe member having a socket formed by an end portion thereof and a radially outwardly directed annular groove in the wall of the pipe member end portion, a packing ring of resiliently deformable material disposed inside the pipe member end portion in the groove and a retaining ring received in an internal recess in the packing ring, the packing ring having an outer peripheral portion to fit with the pipe member wall defining the groove and front and rear projections situated respectively axially in front of, and behind, the retaining ring to the side thereof adjacent the open end of the socket and to the side thereof remote from the open end of the socket respectively, said front projection having a rearwardly extending inner sealing lip to engage over said internal recess in compressive contact with said rear projection to transmit compressive forces to said rear projection on insertion of a further pipe member into the socket, each of said front and rear projections then forming, in co-operation with the inserted pipe member, a pressure shoulder which acts to compress the packing ring against the pipe member wall defining the groove over the whole outer peripheral portion of the packing ring.

12. A pipe member as claimed in claim 11 in which the groove is formed as a corrugation in the wall of the pipe member end portion.

13. A pipe member as claimed in claim 11 in which the groove is of arch shaped contour in axial cross-section of the pipe member.

14. A pipe member as claimed in claim 11 in which the sealing lip is provided towards its rear end with a bead-shaped thickened portion directed towards said rear projection.

15. A pipe member as claimed in claim 14 in which the inward radial extent of the front projection is about equal to the inward radial extent of the rear projection plus the thickness of said thickened portion of said sealing lip.

16. A pipe member as claimed in claim 11 in which at least one passage is formed between said sealing lip and said rear projection upon insertion of a further pipe member into the socket, said passage communicating said internal recess with the interior of the pipe member.

17. A pipe member as claimed in claim 11 in which said front projection extends axially of the pipe member at most as far as the end face of said retaining ring adjacent the open end of the socket.

18. A pipe member as claimed in claim 11 in which the inner sealing lip extends rearwardly from the front projection substantially out of a plane containing the end face of the retaining ring adjacent the open end of the socket.

19. A first pipe member having a socket formed by an end portion thereof and a radially outwardly directed annular groove in the wall of the pipe member end portion, a sealing ring of resiliently deformable material disposed inside the pipe member end portion in the groove and a retaining ring received within an internal recess in the packing ring, said sealing ring having an outer peripheral portion formed to fit within the pipe member wall defining the groove and front and rear projections situated respectively axially in front of and behind the retaining ring to the side thereof adjacent the open end of the socket, said front projection having an inner sealing lip (20) extending rearwardly from said front projection (11) towards the rear projection (12') to engage over said internal recess (10) and retaining ring (5) into compressive contact with said rear projection (12') to transmit compressive forces to the rear projection (12') on insertion of the second pipe member (6) into the socket (2), said projections on said sealing ring upon insertion of said second pipe member into the socket forming in co-operation therewith, pressure shoulders positioned to act so as to compress the packing ring against the pipe member wall defining the groove over the whole outer peripheral portion of the sealing ring, said retaining ring having a trapezoidal cross-sectional shape with two acute angled edges and the retaining ring having its longest side disposed in the roof of said internal recess.

* * * * *